United States Patent Office 3,551,470
Patented Dec. 29, 1970

3,551,470
PROCESS FOR THE AMMOXIDATION OF OLEFINS TO UNSATURATED NITRILES
Wilfrid G. Shaw, Lyndhurst, Robert K. Grasselli, Warrensville Heights, and Harley F. Hardman Lyndhurst, Ohio, assignors to The Standard Oil Company, Cleveland, Ohio, a corporation of Ohio
No Drawing. Filed Dec. 20, 1967, Ser. No. 691,943
Int. Cl. C07c 121/02
U.S. Cl. 260—465.3    3 Claims

ABSTRACT OF THE DISCLOSURE

A catalyst is provided which is useful in the oxidation of olefins to aldehydes, acids and conjugated dienes and in the ammoxidation of olefins to nitriles. The catalyst comprises the combined oxides of antimony, uranium and molybdenum. An effective promoter for the instant catalyst is iron.

BACKGROUND OF THE INVENTION

This invention relates to an oxidation catalyst which comprises oxides of antimony uranium and molybdenum. The instant catalyst is useful in processes for the catalytic oxidation of olefins to aldehydes, acids and conjugated dienes, and for the catalytic ammoxidation of olefins to nitriles. The catalytic oxidation reactions are exemplified by the oxidation of propylene to acrolein and acrylic acid, the oxidation of isobutylene to methacrolein and methacrylic acid, the oxydehydrogenation of an olefin having 4 to 8 carbons, such as the oxydehydrogenation of butene-1 or butene-2 to butadiene-1,3, and the ammoxidation of propylene to acrylonitrile and the ammoxidation of isobutylene to methacrylonitrile. Nitriles and oxygenated compounds such as aldehydes and acids can be produced simultaneously using process conditions within the overlapping ranges for these reactions as set forth in detail below. The relative proportions of each compound that are obtainable will depend on the process conditions, the particular catalyst and on the olefin selected.

In the never-ending search for the better catalyst, workers skilled in the art strive to incorporate into the catalyst higher levels of a host of desirable attributes. Naively summarized, the catalyst is expected to give high yields with razor-sharp selectivity for indefinite periods of time with only the most fleeting attention. Economically these attributes tailored into the catalyst translate to cost-effective operation with maximum profitability. However, reality dictates that an exceptionally outstanding characteristic of a catalyst is usually offset by at least one characteristic that is almost as objectionable as the former is desirable. Thus, a successful catalyst is one which incorporates a blend of enough enviably profitable attributes to make its shortcomings tolerable.

The unpromoted oxidation catalysts disclosed in U.S. 3,198,750 and the promoted oxidation catalysts of U.S. 3,328,315 disclosing promoters selected from a large number of groups and sub-groups of the Periodic Table, by the standards set forth hereinabove, and undoubtedly very successful catalysts. It is therefore all the more surprising that the instant catalyst, incorporating in addition to the oxides of antimony and uranium, the oxide or oxides of molybdenum, the lone element of those which occur in Group VI–B (see Handbook of Chemistry, 38th Edition, Chemical Rubber Publishing Co., Periodic Chart of the Elements, pp. 394 and 395), and not disclosed in the above-identified patent ('315), should have comparable attrition resistance, competitive conversions and selectivity, yet have a lower susceptibility to "clumping" and "burning" and have a lower oxygen requirement during operation which means longer life at a higher reactor throughput with minimal attention. The oxidation catalyst of the instant invention is a particularly successful and rugged catalyst.

The prior art is replete with a multiplicity of oxidation catalysts particularly suited to the same reactions disclosed herein. Some of these oxidation catalysts are disclosed in U.S. Pats. 2,904,580; 3,142,697; 3,179,694; 3,-197,419; 3,198,750; 3,200,081; 3,200,084; 3,226,421; 3,-248,340; 3,264,225; 3,251,900; 3,257,474; 3,260,768; French Pats. 1,255,121; 1,269,382; and British Pats. 864,-666; 876,446; 983,755 and 1,078,156.

More particularly an antimony oxide-uranium oxide catalyst is more fully described in U.S. 3,198,750 and attrition resistant catalysts of these types are described more completely in U.S. 3,314,471. The base catalyst of the instant invention consists essentially of the oxides of antimony, uranium and molybdenum. The exact nature of the chemical compound or compounds which compose the catalyst of this invention is not known. The catalyst may be a mixture of antimony oxide or oxides, uranium oxide or oxides, and molybdenum oxide or oxides. It is also possible that the antimony, uranium and molybdenum are combined with the oxygen to form an antimonate, uranate and molybdate. X-ray examination of the catalyst has indicated the presence of a structurally common phase of the antimony type, comprised of antimony oxide and some form of uranium oxide and/or molybdenum oxide. For the purpose of the description of the invention, the base catalyst will simply be referred to as a mixture of antimony, uranium and molybdenum oxides, but this is not to be construed as meaning that the catalyst is composed either in whole or in part of these compounds.

DESCRIPTION OF PREFERRED EMBODIMENT OF THE INVENTION

The antimony oxide, uranium oxide and molybdenum oxide can be blended together, or can be formed separately and then blended, or formed separately or together in situ. As starting materials for the antimony oxide component, for example, there can be used any antimony oxide, such as antimony trioxide, antimony tetroxide and antimony pentoxide, or mixtures thereof; or a hydrous antimony oxide, meta-antimonic acid, ortho-antimonic acid or pyro-antimonic acid; or a hydrolyzable or decomposable antimony salt, such as an antimony halide, for example, antimony trichloride, trifluoride or tribromide, antimony pentachloride or antimony pentafluoride, which is hydrolyzable in water to form the hydrous oxide. Antimony metal can be employed, the hydrous oxide being formed by oxidizing the metal with an oxidizing acid, such as nitric acid.

The uranium oxide component can be provided in the form of uranium oxide or by precipitation in situ from a soluble uranium salt such as the nitrate, acetate, or a halide such as the chloride. Uranium metal can be used as a starting material, and if antimony metal is also employed, the antimony can be converted to the oxide and uranium to the nitrate simultaneously by oxidation in hot nitric acid.

A slurry of hydrous antimony oxide formed in situ from the metal in nitric acid also can be combined with a solution of a uranium salt such as uranium nitrate, which is then precipitated in situ as uranium oxide by the addition of ammonium hydroxide. If desired, the ammonium salts formed may be removed by filtration, thermal decomposition, or any other means. Generally it will suffice to evaporate the precipitated hydroxides to dryness without filtration. Other convenient ways of preparing the catalyst include coprecipitation of the oxides, or of salts which result in the oxides upon heat-treating, and impregnation of one or more metal oxides with solutions of a salt of the remaining one or more metals which upon heat-treating, result in the oxides.

It will be apparent from the above that uranium tribromide, uranium tetrabromide, uranium trichloride, uranium tetrachloride, uranium pentachloride, uranium hexafluoride, uranium tetraiodide, uranyl nitrate, uranyl sulfate, uranyl chloride, uranyl bromide, uranium trioxide, and uranium peroxide, can be employed as the source of the uranium oxide component.

The molybdenum component can be provided in the form of molybdenum oxide or by precipitation in situ from a soluble molybdenum salt such as molybdenum pentoxide, molybdenum dioxydibromide, dioxydichloride, or dioxydifluoride, molybdenum oxytetrachloride or oxytetrafluoride, molybdenum trioxypentachloride and the like. Preferred salts to provide the molybdenum component are ammonium molybdate, paramolybdate, permolybdate and heptamolybdate.

Other convenient ways of preparing the catalyst include coprecipitation of the oxides, or of salts which result in the oxides upon heat-treating and impregnation of one or more metals, which upon heat-treating, result in the oxides. Examples describing the preparation of catalyst by coprecipitation and impregnation are included hereinbelow.

Those skilled in the art will realize that in general, the manner in which the catalyst components are compounded will affect the results obtained. For example, it is generally found that more molybdenum is required to give similar results when that component is coprecipitated than is required when it is impregnated. Irrespective of the method of incorporating the catalyst components into a base catalyst, it is found that the components' presence in the ranges disclosed exhibits unexpected and highly desirable characteristics as hereinbefore discussed.

The catalytic activity of the base catalyst is enhanced by heating at an elevated temperature. The catalyst mixture is dried and heated at a temperature of from about 500 to about 1150° F., preferably at about 700 to 900° F., for from two to twenty-four hours. If activity then is not sufficient the catalyst can be further heated at a temperature above about 1000° F., but below a temperature deleterious to the catalyst, preferably from about 1400° F., to about 1900° F., for from one to forty-eight hours, in the presence of oxygen. Usually the limit at which the catalyst is adversely affected is not reached before 2000° F. and in some cases this temperature can be exceeded.

In general, the higher the activation temperature, the less time required to effect activation. The sufficiency of activation at any given set of conditions is ascertained by a spot test of a sample of the material for catalytic activity. Activation is best carried out in an open chamber, permitting circulation of air or oxygen, so that any oxygen consumed can be replaced.

Certain combinations of the oxides of antimony uranium and molybdenum display excellent catalytic characteristics. The antimony oxide-uranium oxide-molybdenum oxide base catalyst composition of the instant invention may be defined by the following empirical formula:

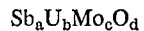

wherein $a$ is 3 to 15, $b$ is 1 to 3, $c$ is 0.001 to 0.5, and $d$ is a number taken to satisfy the average valences of antimony uranium and molybenum in the oxidation states in which they exist in the catalyst as defined by the empirical formula above. Thus, the antimony valence may range from 3 to 5, the uranium valence from 4 to 6 and the molybdenum valence from 2 to 6. It is conjectured that at least some of the combined oxides of the instant catalyst are present as an activated catalytic oxide complex.

The instant base catalyst may be employed without a catalyst support and will display excellent activity. It also can be combined with a support, and preferably at least 10%, and as much as about 90% of the support by weight of the entire composition is usually employed. Any known support materials can be used, such as, for example, silica, alumina, zirconia, alundum, silicon carbide, aluminasilica, and the inorganic phosphates, silicates, aluminates, borates and carbonates stable under the reaction conditions to be encountered in the use of the catalyst.

The promoter of the instant catalyst is the oxide or oxides of iron in an amount in the range corresponding to from about 0.001 to less than 0.75 atom of iron per atom of uranium. The promoter may be included in the base catalyst in the form of soluble iron halides, sulfates, nitrates or other salts. A preferred manner of incorporating iron in the base catalyst is by using ferric nitrate. In any event, it is conjectured that the instant promoted catalyst, after calcination, is composed of the oxides of the elements present and that at least some of the combined oxides of the instant promoted catalyst are present as an activated catalytic oxide complex.

The instant promoter oxide or oxides may be incorporated in the base catalyst by blending the oxide, by coprecipitation or by impregnation. Mixing together an aqueous solution of water-soluble antimony, uranium and molybdenum salts, concentrating the mixture, adding thereto a predetermined amount of a water-soluble iron salt and then concentrating, drying and heat-treating the mixture results in coprecipitated catalytic components. The promoter oxide may also be incorporated in a base catalyst, including a carrier or support, by similarly mixing water-soluble antimony, uranium, molybdenum and iron salts, together with the desired carrier dispersed in water, concentrating the mixture, drying and heat-treating it as hereinafter described. Any of the catalyst supports described hereinabove may be used with the promoted catalyst, the preferred support being silica.

The instant promoter oxide or oxides may be incorporated into the base catalyst by impregnation of heat-treated base catalyst on a support with an aquous ferric nitrate solution as described in the examples included hereinafter.

Generally, the concentrated catalyst is spooned into trays and oven dried at 120° C. overnight. The dried catalyst is calcined starting at 500° F. which temperature is raised to 900° F. over a period of two hours and the calcination carried overnight at this temperature. A further calcination at a higher temperature of above about 1000° F. but below a temperature deleterious to the catalyst, usually for three hours, is sometimes given to increase the activity of the catalyst complex further.

Both the unpromoted and promoted catalysts of the instant invention are extremely rugged even in comparison with an acknowledgedly long-lived catalyst such as the antimony-uranium catalyst disclosed in U.S. Pat. No. 3,198,750. The necessity of comparing these two durable catalysts dictated that a harsh test be devised which would simultaneously deactivate both the known catalyst and the instant catalyst sufficiently to draw some conclusions in a reasonable time (an eight-hour day), without appreciably sacrificing accuracy of the appraisal of the catalysts' activity under normal conditions of manufacturing the unsaturated oxidation products. Such a test was devised and the comparison made using an isobutylene feed, which lent itself ideally to this study of catalyst activity and life.

OXIDATION OF OLEFINS TO ALDEHYDES AND ACIDS

The reactants used in the oxidation to oxygenated compounds are oxygen and an olefin having only three carbon atoms in a straight chain such as propylene or isobutylene or mixtures thereof.

The olefins may be in admixture with paraffinic hydrocarbons, such as ethane, propane, butane, and pentane; for example, a propylene-propane mixture may constitute the feed. This makes it possible to use ordinary refinery streams without special preparation.

The temperature at which this oxidation is conducted may vary considerably depending upon the catalyst, the particular olefin being oxidized and the correlated conditions of the rate of throughput or contact time and the ratio of olefin to oxygen. In general, when operating at pressures near atmospheric, i.e., −10 to 100 p.s.i.g., temperatures in the range of 500 to 1100° F. may be advantageously employed. However, the proces may be conducted at other pressures, and in the case where superatmospheric pressures, e.g., above 100 p.s.i.g., are employed, somewhat lower temperatures are possible. In the case where this process is employed to convert propylene to acrolein, a temperature range of 750 to 950° F. has been found to be optimum at atmospheric pressure.

While pressures other than atmospheric may be employed, it is generally preferred to operate at or near atmospheric pressure, since the reaction proceeds well at such pressures and the use of expensive high pressure equipment is avoided.

The apparent contact time employed in the process is not critical and it may be selected from a broad operable range which may vary from 0.1 to 50 seconds. The apparent contact time may be defined as the length of time in seconds which the unit volume of gas measured under the conditions of reaction is in contact with the apparent unit volume of the catalyst. It may be calculated, for example, from the apparent volume of the catalyst bed, the average temperature and pressure of the reactor, and the flow rates of several components of the reaction mixture.

The optimum contact time will, of course, vary depending upon the olefin being treated, but in the case of propylene and isobutylene, the preferred apparent contact time is 0.15 to 15 seconds.

A molar ratio of oxygen to olefin between about 0.5:1 to 5:1 generally gives the most satisfactory results. For the conversion of propylene to acrolein, a preferred ratio of oxygen to olefin is from about 1:1 to about 2:1. The oxygen used in the process may be derived from any source; however, air is the least expensive source of oxygen and is preferred for that reason.

Water is formed as a product of reaction and it has been found that it has a beneficial influence on the course of the reaction in that it improves the conversion and the yields of the desired product. Sometimes it is desirable to add some water to the reaction mixture. The manner in which water affects the reaction is not fully understood but the theory of this phenomenon is not deemed important in view of the experimental results we have obtained.

Inert diluents, such as nitrogen and carbon dioxide, may be present in the reaction mixture.

OXIDATION OF OLEFINS TO NITRILES

The reactants are the same as those used in the oxidation of olefins to aldehydes described above except that ammonia is included as a reactant. Any of the olefins described above can be used.

In its preferred aspect, the process comprises contacting a mixture comprising propylene or isobutylene, ammonia and oxygen with either the promoted or unpromoted catalyst of this invention at an elevated temperature and at atmospheric or near atmospheric pressure.

Any source of oxygen may be employed in this process. For economic reasons, however, it is preferred that air be employed as the source of oxygen. From a purely technical viewpoint, relatively pure molecular oxygen will give equivalent results. The molar ratio of oxygen to the olefin in the feed to the reaction vessel should be in the range of 0.5:1 to 4:1 and a ratio of about 1:1 to 3:1 is preferred.

Low molecular weight saturated hydrocarbons do not appear to influence the reaction to an appreciable degree, and these materials can be present; consequently the addition of saturated hydrocarbons to the feed to the reaction is contemplated within the scope of this invention. Likewise, diluents, such as nitrogen and the oxides of carbon, may be present in the reaction mixture without deleterious effect.

The molar ratio of ammonia to olefin in the feed to the reactor may vary between about 0.05:1 to 5:1. There is no real upper limit for the ammonia-olefin ratio, but there is generally no reason to exceed the 5:1 ratio. At ammonia:olefin ratios appreciably less than the stoichiometric ratio of 1:1, various amounts of oxygenated derivatives of the olefin will be formed.

Significant amounts of unsaturated aldehydes, as well as nitriles, will be obtained at ammonia-olefin ratios substantially below 1:1, i.e., in the range of 0.15:1 to 0.75:1. Outside the upper limit of this range only insignificant amounts of aldehydes will be produced, and only very small amounts of nitriles will be produced at ammonia-olefin ratios below the lower limit of this range. It is fortuitous that within the ammonia-olefin range stated, maximum utilization of ammonia is obtained and this is highly desirable. It is generally possible to recycle any unreacted olefin and unconverted ammonia.

A particularly surprising aspect of this invention is the effect of water on the course of the reaction. We have found that in many cases water in the mixture fed to the reaction vessel improves the selectivity of the reaction and the yield of nitrile. However, reactions not including water in the feed are not to be excluded from this invention inasmuch as water is formed in the course of the reaction.

In general, the molar ratio of added water to olefin, when water is added, is at least about 0.25:1. Ratios on the order of 1:1 to 3:1 are particularly desirable, but higher ratios may be employed, i.e., up to about 10:1.

The reaction is carried out at a temperature within the range of from about 550 to 1100° F. The preferred temperature range is from about 800 to 1000° F.

The pressure at which the reaction is conducted is also an important variable, and the reaction should be carried out at about atmospheric or slightly above atmospheric (2 to 3 atmospheres) pressure. In general, high pressures, i.e., about 250 p.s.i.g., are not suitable, since higher pressures tend to favor the formation of undesirable by-products.

The apparent contact time is not critical, and contact times in the range of from 0.1 to about 50 seconds may be employed. The optimum contact time will, of course, vary depending upon the olefin being treated, but in general, a contact time of from 1 to 15 seconds is preferred.

THE OXIDATIVE DEHYDROGENATION OF OLEFINS TO DIOLEFINS AND AROMATICS

In accordance with the present invention, the promoted or unpromoted catalyst system is employed in the catalytic oxidative dehydrogenation of olefins to diolefins and aromatic compounds. In the process, the feed stream in vapor form containing the olefin to be dehydrogenated and oxygen is conducted over the promoted catalyst at a comparatively low temperature to obtain the corresponding diolefin or aromatic compound.

By the term "olefin" as used herein is meant the open chain as well as cyclic olefins. The olefins dehydrogenated in accordance with this invention have at least four and up to about eight nonquaternary carbon atoms, of which at least four are arranged in series in a straight chain or ring. The olefins preferably are either normal straight chain or tertiary olefins. Both cis and trans isomers, where they exist, can be dehydrogenated.

Among the many olefinic compounds which can be dehydrogenated in this way are butene-1; butene-2; pentene-1; pentene-2; heptene-1; octene-1; tertiary pentenes and hexenes having one tertiary carbon atom such as 2-methyl - pentene-1, 3-methylbutene-1, 3,4 - dimethyl-pentene-1, 4-methyl-pentene-2; other branched chain olefins such as 2 - methyl-butene-2, 2 - methyl-butene-1, 3-methyl - pentene-2; cyclo-olefins such as cyclopentene; cyclohexene; 3-methyl cyclohexene and cycloheptene.

Open chain olefins yield diolefins, and, in general, six-membered ring olefins yield aromatic ring compounds. The higher molecular weight open chain olefins may cyclize to aromatic ring compounds.

The feed stock in addition to the olefin and oxygen can contain one or more paraffinic or naphthenic hydrocarbons having up to about 10 carbon atoms, which may be present as impurities in some petroleum hydrocarbon stocks and which may also be dehydrogenated in some cases. In this oxidative dehydrogenation reaction, propylene and isobutylene should not be included in the feed in substantial amounts.

The amount of oxygen should be within the range of from about 0.3 to about 3 moles per mole of olefin. Stoichiometrically, 0.5 to 1.5 moles of oxygen per mole of olefin is required for the dehydrogenation to olefins and aromatics respectively. It is preferred to employ an excess of oxygen, from 1 to about 2 moles per mole of olefin, in order to ensure a higher yield of diolefin per pass. The oxygen can be supplied as pure or substantially pure oxygen or as air or in the form of hydrogen peroxide.

When pure oxygen is used, it may be desirable to incorporate a diluent in the mixture such as steam, carbon dioxide or nitrogen.

The feed stock is preferably catalytically dehydrogenated in the presence of steam, but this is not essential. Usually, from about 0.1 to about 6 moles of steam per mole of olefin reactant is employed, but amounts larger than this can be used.

The dehydrogenation proceeds at temperatures within the range of from about 325° C. to about 1000° C. Optimum yields are obtainable at temperatures within the range from about 400 to 550° C. However, since the reaction is exothermic, temperatures in excess of 550° C. should not be used, unless means are provided to carry off the heat liberated in the course of the reaction. Due to the exothermic nature of the reaction, the temperature of the gaseous reaction mixture will be higher than the temperature of the feed entering the system by as much as 75° C. The temperatures referred to are those of the entering gas feed near the reactor inlet.

The preferred reaction pressure is approximately atmospheric, within the range of from about 5 to about 75 p.s.i.g. Higher pressures up to about 300 p.s.i.g. can be used and have the advantage of simplifying the product recovery.

Only a brief contact time with the catalyst is required for effective dehydrogenation. The apparent contact time with the catalyst can vary from about 0.5 up to about 50 seconds but higher contact times can be used if desired. At these contact times, comparatively small reactors and small amounts of catalyst can be used effectively.

In general, any apparatus of the type suitable for carrying out oxidation reactions in the vapor phase may be employed in the execution of these processes. The processes may be conducted either continuously or intermittently. The catalyst bed may be a fixed bed employing a large particulate or pelleted catalyst or, in the alternative, a so-called "fluidized" bed of catalyst may be employed.

The reactor may be brought to the reaction temperature before or after the introduction of the reaction feed mixture. However, in a large-scale operation, it is preferred to carry out the process in a continuous manner, and in such a system, the recirculation of the unreacted olefin is contemplated.

The catalyst compositions and oxidation process of this invention are further illustrated in the following examples wherein the amounts of the various ingredients are expressed as parts by weight unless otherwise specified.

Example 1

An unpromoted antimony-uranium-molybdenum catalyst is prepared by impregnating the molybdenum on to the antimony and uranium components as follows:

Part A.—3.9 parts of antimony oxide ($Sb_2O_3$) and 1.65 parts uranium oxide ($U_3O_8$) are dissolved in 15 parts of nitric acid; the mixture is heated for about 2.5 hours in a vessel equipped with a reflux condenser and an agitator. Add 6.1 parts of water and cool to about 50° C. Add 5 parts Ludox® AS (a 30% dispersion of silica in water) and mix vigorously to keep the solids in suspension. Adjust the pH of the mixture to about 8.5 with 30% $NH_4OH$ solution. Filter the catalyst and dry the filter cake overnight in an oven at 120° F. Remove the oven-dried catalyst and calcine it in a furnace open to the atmosphere for about 2 hours at 800° F. A further calcination is obtained by increasing the temperature to about 1700° F. and heat-treating for a period of about 2.5 hours.

2.5 parts of the solids thus obtained are blended with 8.3 parts of Ludox®. If the mixture does not gel, add a few drops of 20% $NH_4NO_3$. The gelled mixture is spooned into trays and dried overnight at low temperatures. The dried mixture is again calcined for about 2 hours at about 1725° F., cooled, ground and screened.

Part B.—0.375 part of ammonium molybdate.

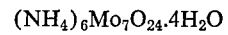

$(NH_4)_6Mo_7O_{24}\cdot 4H_2O$ is dissolved in 400 parts water and the solution is poured over 636 parts of catalyst prepared as in Part A above. The mixture is stirred thoroughly and dried overnight at 120° C. in a conventional oven and then heat-treated at 1000° F. for 2 hours. The result is a catalyst which has been impregnated with the molybdenum component and which has a surface area of about 20 sq. meters/gram.

Example 2

An unpromoted antimony-uranium-molybdenum catalyst is prepared by coprecipitation as follows:

99.7 parts antimony oxide ($Sb_2O_3$), 42.1 parts uranium oxide ($U_3O_8$) and 1.32 parts ammonium heptamolybdate were dissolved in 270 parts nitric acid with stirring and simultaneous heating. The mixture is refluxed for about 3 hours at 120–121° C. and cooled. 1290 parts Ludox® AS (a 30% dispersion of silica in water) is added slowly with stirring, the mixture is adjusted to a pH of about 8.5 with a 28% solution of ammonium hydroxide and heated till it thickened into a paste. The paste was dried overnight at 120° C. in a conventional oven, further heat-treated at 800° F. for 2 hours and cooled. The catalyst was ball-milled for about 2.5 hours and given a further calcination at 1675° F. for 2 hours in a furnace open to the atmosphere. The catalyst was then cooled and ball-milled for 2 hours. This catalyst, prepared as described herein, was compounded with sufficient Ludox® AS solution so that, upon drying, the catalyst comprised 60% by weight active ingredient and 40% by weight silica carrier.

Example 3

An iron promoted antimony-uranium-molybdenum catalyst is prepared by impregnating the molybdenum and iron on to antimony and uranium components, as follows:

0.45 part of ferric nitrate, $Fe(NO_3)_3 \cdot 9H_2O$ and 0.06 part of ammonium molybdate $(NH_4)_6Mo_7O_{24} \cdot 4H_2O$ were dissolved in about 20 parts distilled water added thereto. The aqueous solution was poured over 50 parts of the composition obtained in Part A of Example 1 hereinabove with constant stirring to obtain uniform wetting of the solids. The wet solids were then dried at 120° C. overnight and subsequently heat-treated for 2 hours at 1000° F.

Example 4

An iron promoted antimony - uranium - molybdenum catalyst is prepared by coprecipitation as follows:

42.1 parts uranium oxide ($U_3O_8$), 99.7 parts antimony oxide ($Sb_2O_3$), 6.06 parts ferric nitrate $Fe(NO_3)_3 \cdot 9H_2O$ and 0.66 part ammonium molybdate were charged to a vessel equipped with a stirrer and a reflux condenser. About 350 parts of 70% concentrated $HNO_3$ acid were slowly added to the vessel while the contents were stirred and heated for 3 hours at about 120° C. The mixture was then cooled and transferred to another vessel where 130 parts of Ludox® AS (a 30% dispersion of silica in water) were added, and the mixture homogenized. The mixture was neutralized with a 28% ammonia solution to a pH of about 8.5 and concentrated to a paste which was spooned into trays and oven dried at 120° C. overnight. The dried paste was heat-treated at 800° F. for 2 hours then calcined at 1675° F. for an additional 2-hour period.

Examples 5 and 6

In an accelerated deactivation test the following examples were run in a fluid-bed reactor at about 850° F. at about atmospheric pressure with an apparent contact time of about 3 seconds. Apparent contact time is defined as the length of time in seconds which the unit volume of gas measured under the conditions of reaction is in contact with the apparent unit volume of the catalyst. The olefin fed was isobutylene and the molar feed ratio was $$iC_4^=/Air/NH_3 = 1/14/1.2$$

In Table I below is a comparison of the useful products of reaction at the end of each hour on stream with a known antimony-uranium catalyst and the instant antimony-uranium-molybdenum catalyst. The main product is methacrylonitrile, though, as the detailed analysis of recovery runs shows in the Table I hereinbelow, minor amounts of other compounds are formed.

Examples 7–10

In an accelerated deactivation test the following examples of spray-dried and impregnated catalysts were run in a fluid-bed reactor at about 850° F. at about 1.5 p.s.i.g. with an apparent contact time of about 3.5 seconds. The olefin fed was isobutylene, and the molar feed ratio was $iC_4^=/Air/NH_3 = /1.14/1.2$. For convenience, conversion to "useful" products is tabulated (rather than an analysis of individual components as was done in Table I hereinbefore).

TABLE II

| Example No.: | Catalyst, atomic ratio | Onstream time, hours | | | | |
|---|---|---|---|---|---|---|
| | | 1 | 2 | 3 | 4 | 5 |
| | | Percent per pass conversion to useful products | | | | |
| 7[A] | $Sb_{4.56}U_1O_d$[1] | 82 | 77 | 75 | 63 | 50 |
| 8 | $Sb_{4.56}U_1Mo_{.01}O_d$ | 85 | 85 | 84 | 83 | 84 |
| 9 | $Sb_{4.56}U_1Fe_{0.033}O_d$ | 79 | 77 | 72 | 61 | 44 |
| 10 | $Sb_{4.56}U_1Mo_{.01}Fe_{0.033}O_d$ | 86 | 86 | 85 | 85 | 84 |

[A] The catalyst in this Example 7 is a known catalyst (see U.S. Patent 3,198,750).
[1] The suffix d denotes the amount of oxygen taken to satisfy the oxidation state of the elements in the catalyst.

Examples 11–13

In an accelerated deactivation test the following examples of coprecipitated catalysts were ground and screened to a mesh size of from 80 to 170 Tyler mesh. The catalysts were loaded into a fluid-bed reactor and the runs made at about 850° F. and at about atmospheric pressure with an apparent contact time of about 3 seconds. The olefin fed was isobutylene, and the molar feed ratio was $iC_4^=/Air/NH_3 = 1/14/1.2$; the main product formed was methacrylonitrile.

TABLE III

| Example No.: | Catalyst, atomic ratio | Onstream time, hours | | | | |
|---|---|---|---|---|---|---|
| | | 1 | 2 | 3 | 4 | 5 |
| | | Percent per pass conversion to useful products | | | | |
| 11[A] | $Sb_{4.56}U_1O_d$[1] | 75 | 66 | 57 | 51 | 41 |
| 12 | $Sb_{4.56}U_1Mo_{.05}O_d$ | 66 | 65 | 63 | 60 | 60 |
| 13 | $Sb_{4.56}U_1Mo_{.05}Fe_{0.1}O_d$ | 73 | 70 | 70 | 69 | 68 |

[A] The catalyst in this Example 11 is a known catalyst (see U.S. Patent 3,198,750).
[1] The suffix d denotes the amount of oxygen taken to satisfy the oxidation state of the elements in the catalyst.

Examples 14–22

The following Table IV indicates the effectiveness of unpromoted antimony oxide-uranium oxide-molybdenum oxide catalysts, and iron-promoted antimony oxide-uranium oxide-molybdenum oxide catalysts in the preparation of α-β monoolefinically unsaturated nitriles. When the olefin fed is isobutylene the product is mainly methacrylonitrile, when the olefin fed is propylene the product is mainly acrylonitrile.

TABLE I

| Ex. No. | Catalyst,[1] atomic ratio | Time on stream, hours | Percent corrected per pass conversion | | | | | | | | | | |
|---|---|---|---|---|---|---|---|---|---|---|---|---|---|
| | | | MAN | MA | AN | Aceto | Acetone | Acetaldehyde | HCN | Useful | CO | $CO_2$ | Total |
| 5[A] | Sb/U=4.56/1 | 1 | 67.6 | 2.5 | 2.2 | 2.1 | 0.4 | 0.1 | 6.8 | 81.7 | 5.9 | 11.4 | 99.0 |
| | Sb/U=4.56/1 | 2 | 59.4 | 4.2 | 1.6 | 2.5 | 0.4 | 1.0 | 7.8 | 76.9 | 5.1 | 10.9 | 92.9 |
| | Sb/U=4.56/1 | 3 | 56.6 | 3.9 | 2.0 | 2.6 | 0.7 | 0.9 | 7.9 | 74.6 | 5.1 | 13.7 | 93.4 |
| | Sb/U=4.56/1 | 4 | 48.2 | 3.2 | 1.3 | 2.1 | 0.5 | 0.7 | 7.4 | 63.4 | 5.2 | 17.1 | 86.7 |
| | Sb/U=4.56/1 | 5 | 36.9 | 3.0 | 0.5 | 1.4 | 0.1 | 0.7 | 7.3 | 49.9 | 5.0 | 24.0 | 79.2 |
| 6 | Sb/U/Mo 4.56/1/.01 | 1 | 69.0 | 2.7 | 1.9 | 2.4 | 0.5 | 0.2 | 8.4 | 85.1 | 4.2 | 7.0 | 96.3 |
| | Sb/U/Mo=4.56/1/.01 | 2 | 67.6 | 3.5 | 1.6 | 2.4 | 0.3 | 0.4 | 8.8 | 84.6 | 4.5 | 7.0 | 96.1 |
| | Sb/U/Mo=4.56/1/.01 | 3 | 68.6 | 3.1 | 1.6 | 2.5 | 0.4 | 0.7 | 7.4 | 84.3 | 4.4 | 7.2 | 95.9 |
| | Sb/U/Mo=4.56/1/.01 | 4 | 68.1 | 2.9 | 1.7 | 2.1 | 0.5 | 0.5 | 8.0 | 83.8 | 4.4 | 7.6 | 95.8 |
| | Sb/U/Mo=4.56/1/.01 | 5 | 67.4 | 2.9 | 1.7 | 2.3 | 0.4 | 0.7 | 9.0 | 84.4 | 4.2 | 7.3 | 95.9 |

[A] The catalyst in this Example 5 is a known catalyst (see U.S. Patent 3,198,750).
[1] The oxygen content of the catalyst is omitted here, for convenience.

TABLE IV

| Catalyst,[1] atomic ratio | Feed ratio, C=/NH₃/air | Apparent contact time, seconds | Temp., °F. | Percent per pass conversion | | |
|---|---|---|---|---|---|---|
| | | | | Acrylo-nitrile | Methac-ryloni-trile | Aceto-nitrile |
| Sb/U/Mo | | | | | | |
| Example No.: | | | | | | |
| 14 ................ 2.33/1/0.01 | 1/1/20 | 2.3 | 850 | .......... | 57.6 | 1.1 |
| 15 ................ 7.82/1/0.01 | 1/1/20 | 2.3 | 800 | .......... | 21.3 | 0.9 |
| 16 ................ 7.82/1/0.01 | 1/1/20 | 2.3 | 850 | .......... | 30.6 | 1.8 |
| 17 ................ 4.56/1/0.01 | 1/1.2/14 | 3 | 850 | .......... | 69.1 | 1.7 |
| 18 ................ 4.56/1/0.01 | 1/1.2/12 | 4.7 | 900 | 76.4 | .......... | 2.0 |
| 19 ................ 7.82/1/0.01 | 1/1.2/12 | 4.7 | 850 | 59.2 | .......... | 3.1 |
| Sb/U/Mo/Fe | | | | | | |
| 20 ................ 2.33/1/0.01/.03 | 1/1/20 | 2.3 | 850 | .......... | 59.4 | 1.2 |
| 21 ................ 4.56/1/0.01/.03 | 1/1.2/12 | 4.7 | 900 | 76.8 | .......... | 1.8 |
| 22 ................ 7.82/1/0.01/.03 | 1/1.2/12 | 4.7 | 850 | 57.3 | .......... | 2.7 |

[1] The oxygen content of the catalyst is omitted here, for convenience.

Examples 23–26

The following Tables V and VI indicate the effectiveness of unpromoted antimony oxide-uranium oxide-molybdenum oxide catalysts, and iron-promoted antimony oxide-uranium oxide-molybdenum oxide catalysts in the preparation of α-β monoolefinically unsaturated aldehydes and acids.

Examples 29–30

The following examples (29 and 30) exhibit the surprising long-lived stability and ruggedness of the instant promoted catalyst as exemplified by the difficulty with which said catalyst is deactivated in comparison with a representative, known antimony - oxide - uranium oxide catalyst under the deliberately harsh conditions of accelerated deactivation. The reactor was a fixed-bed reactor, oxygen in the effluent was maintained at 2–3%, the apparent contact time was about 5 seconds, the reaction temperature was about 875° F. and the pressure atmospheric. Mole ratio of $C_3^=$/Air/NH₃ was about 1/11/1.2.

TABLE V

| Catalyst,[1] atomic ratio | Feed rato, C₃=/air | Apparent contact time, seconds | Temp., °F. | Percent per pass conversion | |
|---|---|---|---|---|---|
| | | | | Acrolein | Acrylic acid |
| Example No.: | | | | | |
| 23 ............ Sb/U/Mo, 4.56/1/.025 | 1/12 | 5 | 850 | 46.2 | 1.5 |
| 24 ............ Sb/U/Mo/Fe, 4.56/1/.025/1 | 1/12 | 5 | 850 | 48.3 | 1.7 |

[1] The oxygen content of the catalyst is omitted here, for convenience.

TABLE VI

| Catalyst,[1] atomic ratio | Feed ratio C₄=/air | Apparent contact time, seconds | Temp., °F. | Percent per pass conversion | |
|---|---|---|---|---|---|
| | | | | Meth-acrolein | Meth-acrylic acid |
| Example No.: | | | | | |
| 25 ............ Sb/U/Mo, 4.56/1/.01 | 1/14 | 4 | 850 | 53.5 | 2.3 |
| 26 ............ Sb/U/Mo/Fe, 4.56/1/.01/.03 | 1/14 | 4 | 850 | 55.6 | 1.8 |

[1] The oxygen content of the catalyst is omitted here for convenience.

Examples 27–28

The following Table VII indicates the effectiveness of unpromoted antimony oxide-uranium oxide-molybdenum oxide catalysts, and of iron-promoted antimony oxide-uranium oxide-molybdenum oxide catalysts in the oxydehydrogenation of 1-butene to butadiene.

TABLE VII

| Catalyst[1], atomic ratio | Feed ratio, C₄=/air | Apparent contact time, seconds | Temp. °F. | Percent per pass conversion to butadiene |
|---|---|---|---|---|
| Example No.: | | | | |
| 27 ............ Sb/U/Mo, 4.56/1/.01 | 1/12 | 4 | 850 | 44.1 |
| 28 ............ Sb/U/Mo/Fe, 4.56/1/.01/.03 | 1/12 | 4 | 850 | 43.3 |

[1] The oxygen content of the catalyst is omitted here, for convenience.

TABLE VIII

| Hours on stream: | Percent per pass conversion to acrylonitrile | |
|---|---|---|
| | With $Sb_{4.56}U_1O_d$[1] (Example 29) | With $Sb_{4.56}U_1Mo_{.01}Fe_{0.033}O_d$+ (Example 30) |
| 2.5 | 72.7 | 78.6 |
| 4 | 73.4 | |
| 6.5 | | 76.6 |
| 8 | 67.5 | |
| 11 | | 72.5 |
| 14.5 | | 74.8 |
| 15.5 | 65.5 | |
| 18 | 61.7 | 68.9 |
| 21 | 58.6 | |
| 23 | | 68.1 |
| 24 | 55.4 | |
| 26 | | 67.4 |
| 28 | 51.8 | |
| 30 | 52.5 | |

[1] The suffix d denotes the amount of oxygen taken to satisfy the oxidation state of the elements in the catalyst.

NOTE.—The blanks in the table above indicate that no recovery run was made at that time to determine conversion.

In the claims below the term "consisting essentially of" is meant to include the main elements namely antimony, uranium, molybdenum and iron but is not meant to exclude small amounts of other elements the presence of which may be incident to the quality, origin or particular processing of raw materials used to manufacture the instant catalyst. It will be apparent to those skilled in the catalytic oxidation art that embodiments of the invention other than those specifically described for illustrative purposes, may be evolved and that modifications in these specific embodiments may be made without departing from the spirit and scope of the invention as expressed above and as defined in the appended claims.

We claim:

1. The process for the ammoxidation of propylene and isobutylene to form acrylonitrile and methacrylonitrile respectively which comprises contacting in a vapor phase at a temperature within the range from about 650° F. to about 1100° F. a mixture of ammonia, a molecular oxygen containing gas and either propylene or isobutylene, or mixtures thereof, in a molar ratio of olefin to ammonia of from about 1:0.05 to about 1:5 and a molar ratio of oxygen to olefin within the range from about 0.5:1 to about 4:1, in the presence of an iron-promoted catalyst composition of the empirical formula $$Fe_xSb_aU_bMo_cO_d$$

wherein $x$ is a number greater than or equal to 0.001 but less than 0.15, $a$ is a number within the range from about 3 to about 15, $b$ is a number within the range from about 1 to about 3, $c$ is a number within the range from about 0.001 to about 0.5, and $d$ is a number taken to satisfy the oxidation state of the elements in the catalytic oxidation complex.

2. The process of claim 1 wherein said catalyst composition is supported on a catalyst support comprising from about 5 to about 95 percent by weight of said catalyst composition.

3. The process for the ammoxidation of propylene and isobutylene to form acrylonitrile and methacrylonitrile, respectively, which comprises contacting in the vapor phase at a temperature within the range from about 650° F. to about 1100° F. a mixture of ammonia, a molecular oxygen-containing gas and either propylene or isobutylene, or mixtures thereof, in a molar ratio of olefin to ammonia of from about 1:0.05 to about 1:5, and a molar ratio of oxygen to olefin within the range from 0.5:1 to about 4:1, in the presence of a catalyst composition consisting essentially of an active catalytic oxide complex of antimony, uranium and molybdenum having the empirical formula $Sb_aU_bMo_cO_d$ wherein $a$ is a number within the range 3 to 15; $b$ is a number within the range 1 to 3; $c$ is a number within the range 0.001 to 0.5; and $d$ is a number taken to satisfy the oxidation state of the elements in the catalytic oxidation complex, said complex being formed by heating the mixed oxides of antimony, molybdenum and uranium in the presence of oxygen at an elevated temperature of above 500° F. but below its melting point.

References Cited

UNITED STATES PATENTS

| 3,328,315 | 6/1967 | Callahan et al. | 260—465.3 |
| 3,338,952 | 8/1967 | Callahan et al. | 260—465.3X |

JOSEPH P. BRUST, Primary Examiner

U.S. Cl. X.R.

252—432, 443, 456, 467, 470; 260—533, 604, 668, 673.5, 680, 683.3